United States Patent
Yim et al.

(10) Patent No.: US 7,754,378 B2
(45) Date of Patent: Jul. 13, 2010

(54) SECONDARY BATTERY WITH A SEALING PLATE USED TO SEAL AN ELECTROLYTE INJECTION HOLE IN A CAP PLATE

(75) Inventors: Hoon Yim, Asan-si (KR); Soo-Yeon Maeng, Incheonkwangyok-si (KR); Kyu-Woong Cho, Suwon-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1183 days.

(21) Appl. No.: 11/157,173

(22) Filed: Jun. 21, 2005

(65) Prior Publication Data

US 2006/0024573 A1    Feb. 2, 2006

(30) Foreign Application Priority Data

Jun. 25, 2004   (KR)   ........................ 10-2004-0047999
Nov. 9, 2004   (KR)   ........................ 10-2004-0090840

(51) Int. Cl.
*H01M 2/02*    (2006.01)
*H01M 2/08*    (2006.01)

(52) U.S. Cl. ........................ 429/171; 429/185
(58) Field of Classification Search ............... 429/163, 429/72, 185, 171
See application file for complete search history.

(56) References Cited

U.S. PATENT DOCUMENTS

| 6,190,798 | B1 * | 2/2001 | Okada et al. ............... 429/163 |
| 2004/0115521 | A1 * | 6/2004 | Cho ........................ 429/72 |
| 2005/0079413 | A1 * | 4/2005 | Schubert ................... 429/185 |

FOREIGN PATENT DOCUMENTS

| JP | 2002-373642 | 12/2002 |
| JP | 2002373642 A * | 12/2002 |

* cited by examiner

*Primary Examiner*—Dah-Wei D Yuan
*Assistant Examiner*—Zachary Best
(74) *Attorney, Agent, or Firm*—Robert E. Bushnell, Esq.

(57) ABSTRACT

In a secondary battery having an electrolyte injection hole having improved sealing structure to improve the safety of the can-type secondary battery and to prevent the electrolyte from leaking, the electrolyte injection hole is sealed by welding the sealing plate on top of the cap plate so that the electrolyte is prevented from flowing into the welded portion. Since no fine gap is created in the electrolyte injection hole, the electrolyte is prevented from flowing into the welded portion due to a capillary phenomenon and no pin hole caused by the electrolyte is formed in the welded portion.

23 Claims, 7 Drawing Sheets

SECONDARY BATTERY WITH A SEALING PLATE USED TO SEAL AN ELECTROLYTE INJECTION HOLE IN A CAP PLATE

CLAIM OF PRIORITY

This application makes reference to, incorporates the same herein, and claims all benefits accruing under 35 U.S.C. §119 from applications for SECONDARY BATTERY and for SECONDARY BATTERY AND CAP ASSEMBLY THEREOF earlier filed in the Korean Intellectual Property Office on $25^{th}$ of Jun. 2004 and $9^{th}$ of Nov. 2004 and there duly assigned Serial Nos. 10-2004-0047999 and 10-2004-0090840.

BACKGROUND OF THE INVENTION

1. Field of the Invention

The present invention relates to a secondary battery, and more particularly to a secondary battery having an electrolyte injection hole having an improved sealing structure to improve the safety of the secondary battery and to prevent the electrolyte from leaking.

2. Description of the Related Art

As portable wireless appliances including video cameras, portable telephones, and portable computers tend to have reduced weight while incorporating more functions, much research has been conducted on secondary batteries which are used as the driving source of the appliances. For example, secondary batteries include nickel cadmium batteries, nickel hydrogen batteries, nickel zinc batteries, and lithium secondary batteries. The lithium secondary batteries are widely used in the cutting-edge electronic appliance fields, because they can be recharged, they can be manufactured in a compact size with large capacity, and they have high operating voltage and high energy density per unit weight.

Such a secondary battery is formed by placing a generator element (i.e., an electrode assembly) including positive and negative electrode plates and a separator into a can made of metal, injecting an electrolyte into the can, and sealing the can. After the can is sealed, an electrode terminal is positioned on top of the secondary battery while being insulated from the can. The electrode terminal acts an electrode of the battery and the can itself acts as the other electrode thereof.

After being sealed, the secondary battery is connected to battery safety devices including a secondary protective device (e.g., a PTC) and a protective circuit module and is placed into a battery pack. The battery safety devices are connected to the positive and negative electrodes, respectively, to interrupt currents when the temperature or voltage of the battery rises due to overcharging/over-discharging and prevent danger, such as fracture of the battery.

In a secondary battery having an electrolyte injection hole formed on the cap plate of a bare cell, the can is a metallic container having a cuboid shape with an open top and is preferably made of aluminum or aluminum alloy which is light and conductive and which has resistance to corrosion. The can acts as a container for an electrode assembly including a positive electrode, a separator, and a negative electrode and for an electrolyte. The electrode assembly is inserted into the can via the open top, i.e., the top opening, which is then sealed by a cap assembly.

The cap assembly is provided with a planar cap plate having a size and shape corresponding to those of the top opening of the can. The cap plate is preferably made of the same material as the can (i.e., aluminum or aluminum alloy) for improved weldability to the can. The cap plate has a terminal through-hole formed at the center thereof so that an electrode terminal can pass through. A tubular gasket is positioned on the exterior of the negative terminal, which passes through the center of the cap plate, for electrical insulation between the negative terminal and the cap plate. An insulation plate is positioned on the bottom surface of the cap plate near the terminal through-hole of the cap plate. A terminal plate is positioned on the bottom surface of the insulation plate.

The electrode assembly is formed by winding the positive and negative electrodes with the separator interposed between them. The positive electrode is electrically connected to the cap plate via a positive electrode tab and the negative electrode is electrically connected to the negative terminal of the cap plate via a negative electrode tab. Therefore, the can is electrically insulated from the negative terminal and acts as a positive terminal. After the cap assembly is welded to the top of the can, an electrolyte is injected via the electrode injection hole of the cap plate. The electrode injection hole is sealed by a plug made of an aluminum ball pressed therein. In addition, a liquid-state resin or resin droplets can be applied on top of the plug and cured by light or heat to prevent the electrolyte from leaking in a two-fold manner.

A lead plate is formed on top of the electrolyte injection hole and is coupled to a separate protective circuit module. The lead plate has a bottom portion having at least a predetermined area for surface-to-surface coupling to the cap plate of the bare cell and an extension portion extending vertically from the bottom portion for coupling to the electrical terminal of the protective circuit module. The extension portion is connected to the electrode tab of the overlying protective circuit module.

However, suchl secondary batteries have a problem in that, since the electrolyte injection hole is sealed by pressing a plug made of an aluminum ball therein, a fine gap tends to exist between the electrolyte injection hole and the plug and the electrolyte can leak through the gap. Particularly, a larger amount of electrolyte is injected into the can, as secondary batteries tend to have larger capacity, and the electrolyte can leak to the top of the electrolyte injection hole due to the capillary phenomenon between the electrolyte injection hole and the pressed ball. Consequently, the welding between the electrolyte injection hole and the ball becomes unstable due to the electrolyte and a pin hole is created at the welded portion.

Furthermore, the thin cap plate deforms as the aluminum ball is pressed into the electrolyte injection hole and so does the electrolyte injection hole. As a result, a fine gap is formed between the electrolyte injection hole and the aluminum ball even when the aluminum ball is pressed into the electrolyte injection hole and the electrolyte can leak.

SUMMARY OF THE INVENTION

Accordingly, the present invention has been made to solve the above-mentioned problems occurring in the prior art, and an object of the present invention is to provide a secondary battery having an electrolyte injection hole having improved sealing structure to improve the safety of the secondary battery and prevent the electrolyte from leaking.

In order to accomplish this object, a secondary battery is provided comprising: an electrode assembly including positive and negative electrode plates; a can adapted to contain the electrode assembly and an electrolyte; a cap assembly including a cap plate having an electrolyte injection hole arranged on a side thereof and adapted to seal a top opening of the can; and a sealing plate arranged on a top surface of the cap plate and adapted to seal the electrolyte injection hole.

The sealing plate is preferably welded to the top surface of the cap plate. The sealing plate is preferably welded such that a welded portion defines a closed loop on a periphery of the electrolyte injection hole. The welded portion preferably comprises a ring shape arranged about the electrolyte injection hole. An inner side of the ring of the welded portion is preferably spaced at least 0.1 mm from the electrolyte injection hole.

The sealing plate is preferably welded by laser welding. The welding depth is preferably in a range of 0.15 mm to 0.50 mm. The sealing plate preferably comprises a nickel metal plate. The sealing plate preferably comprises an upper nickel metal plate bonded to a lower aluminum metal plate.

The sealing plate preferably comprises an upper nickel metal plate bonded to a lower aluminum metal plate. The sealing plate preferably has a thickness in a range of 0.05 to 0.45 mm.

The secondary battery preferably further comprises a protective circuit module electrically coupled to the cap assembly; the sealing plate preferably extends along a longitudinal direction, and one side of the sealing plate is preferably welded to the electrolyte injection hole, and an electrode tab of the protective circuit module is preferably connected to another side thereof.

The sealing plate preferably has an extension extending upward from a lateral surface of another side thereof and the electrode tab of the protective circuit module is preferably connected to the extension.

The cap plate preferably has a seating groove arranged on top of the electrolyte injection hole, the groove preferably having a size corresponding to that of the sealing plate to seat the sealing plate thereon.

The sealing plate preferably has a welding member protruding downward in an area corresponding to the electrolyte injection hole and the welding member is preferably welded to the cap plate at an outer portion of the welding member.

The welding member preferably has a circular or square shape having a diameter or side larger than a diameter of the electrolyte injection hole.

The sealing plate preferably has an elastic body arranged on the bottom surface thereof, the elastic body preferably having an outer diameter corresponding to an inner diameter of the electrolyte injection hole.

The elastic body has a height less than a thickness of the cap plate.

The elastic body preferably comprises an organic material chosen from a group consisting of PolyPropylene (PP), PolyPhenylene Sulfide (PPS), PolyImide (PI), and Nylon 66.

The secondary battery preferably further comprises a protective circuit module electrically coupled to the cap assembly; the protective circuit module preferably has positive and negative electrode lead plates connected to the positive and negative electrodes of the secondary battery and the sealing plate preferably comprises one of the lead plates and is fixed on top of the electrolyte injection hole while forming a welded portion larger than an outer periphery of the electrolyte injection hole.

The lead plate preferably comprises a conductive plate.

The negative electrode lead plate is preferably welded and fixed to the negative terminal of the secondary battery and the positive electrode lead plate is preferably welded and fixed to the cap plate on top of the electrolyte injection hole.

The protective circuit module is preferably arranged on top of the cap assembly.

The welded portion preferably surrounds an outer periphery of the electrolyte injection hole.

An area of the welded portion is preferably at least twice a sectional area of the electrolyte injection hole.

The welded portion preferably has at least two welding lines and one of the welding lines preferably surrounds the other welding line.

An upper portion of the electrolyte injection hole is preferably chamfered.

The electrode assembly preferably comprises the positive and negative electrode plates being wound together with a separator arranged therebetween.

The secondary battery preferably further comprises a protective circuit module electrically coupled to the cap assembly.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 2b is a top view of the secondary battery of FIG. 2a;

FIG. 5b is a top view of the sealing plate of FIG. 5a;

FIG. 8b is a partial top view of a lead plate of a protective circuit module for sealing the electrolyte injection hole of the secondary battery of FIG. 8a.

DETAILED DESCRIPTION OF THE INVENTION

Figure 1:
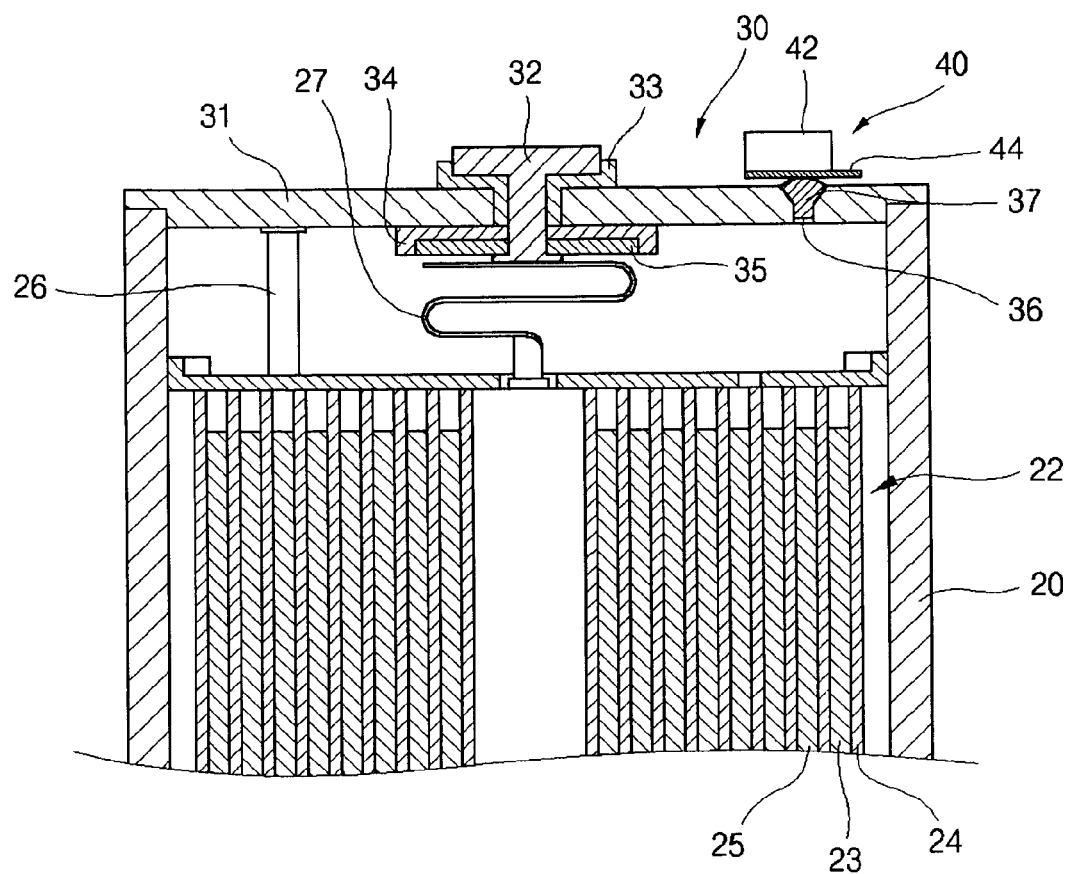
FIG. 1 is a partial sectional view of an upper portion of a secondary battery having an electrolyte injection hole formed on a cap plate of a bare cell.

FIG. 1 is a partial sectional view of an upper portion of a secondary battery having an electrolyte injection hole formed on a cap plate of a bare cell.

Referring to FIG. 1, a can 20 is a metallic container having a cuboid shape with an open top and is preferably made of aluminum or an aluminum alloy which is light and conductive and which is resistant to corrosion. The can 20 acts as a container for an electrode assembly 22 including a positive electrode 23, a separator 24, and a negative electrode 25 and for an electrolyte. The electrode assembly 22 is inserted into the can 20 via an open top, i.e., the top opening, which is then sealed by a cap assembly 30.

The cap assembly 30 is provided with a planar cap plate 31 having a size and shape corresponding to that of the top opening of the can 20. The cap plate 31 is preferably made of the same material as the can 20 (i.e., aluminum or an aluminum alloy) for improved weldability to the can 20. The cap plate 31 has a terminal through-hole formed at the center thereof so that an electrode terminal can pass therethrough. A tubular gasket 33 is positioned on the exterior of the negative terminal 32, which passes through the center of the cap plate 31, for electrically insulating the negative terminal 32 from the cap plate 31. An insulation plate 34 is positioned on the bottom surface of the cap plate 31 near the terminal through-hole of the cap plate 31. A terminal plate 35 is positioned on the bottom surface of the insulation plate 34.

The electrode assembly 22 is formed by winding the positive and negative electrodes 23 and 24 with the separator 25 interposed between them. The positive electrode 23 is electrically connected to the cap plate 31 via a positive electrode tab 26 and the negative electrode 25 is electrically connected to the negative terminal 32 of the cap plate 31 via a negative electrode tab 27. Therefore, the can 20 is electrically insulated from the negative terminal 32 and acts as a positive terminal. After the cap assembly 30 is welded to the top of the can 20, an electrolyte is injected via the electrode injection hole 36 of the cap plate 31. The electrode injection hole 36 is sealed by a plug 37 made of an aluminum ball pressed therein. In addition, a liquid-state resin or resin droplets can be applied on top of the plug 37 and cured by light or heat to prevent the electrolyte from leaking in a two-fold manner.

A lead plate 40 is formed on top of the electrolyte injection hole 36 and is coupled to a separate protective circuit module. The lead plate 40 has a bottom portion 42 having at least a predetermined area for surface-to-surface coupling to the cap plate 31 of the bare cell and an extension portion 44 extending vertically from the bottom portion 42 for coupling to the electrical terminal of the protective circuit module. The extension portion 44 is connected to the electrode tab of the overlying protective circuit module.

However, such secondary batteries have a problem in that, since the electrolyte injection hole 36 is sealed by pressing a plug 37 made of an aluminum ball therein, a fine gap tends to exist between the electrolyte injection hole 36 and the plug 37 and the electrolyte can leak through the gap. Particularly, a larger amount of electrolyte is injected into the can 20, as secondary batteries tend to have larger capacity, and the electrolyte can leak to the top of the electrolyte injection hole 36 due to the capillary phenomenon between the electrolyte injection hole 36 and the pressed ball 37. Consequently, the welding between the electrolyte injection hole 36 and the ball 37 becomes unstable due to the electrolyte and a pin hole is created at the welded portion.

Furthermore, the thin cap plate deforms as the aluminum ball is pressed into the electrolyte injection hole and so does the electrolyte injection hole. As a result, a fine gap is formed between the electrolyte injection hole and the aluminum ball even when the aluminum ball is pressed into the electrolyte injection hole and the electrolyte can leak.

Figure 2A:
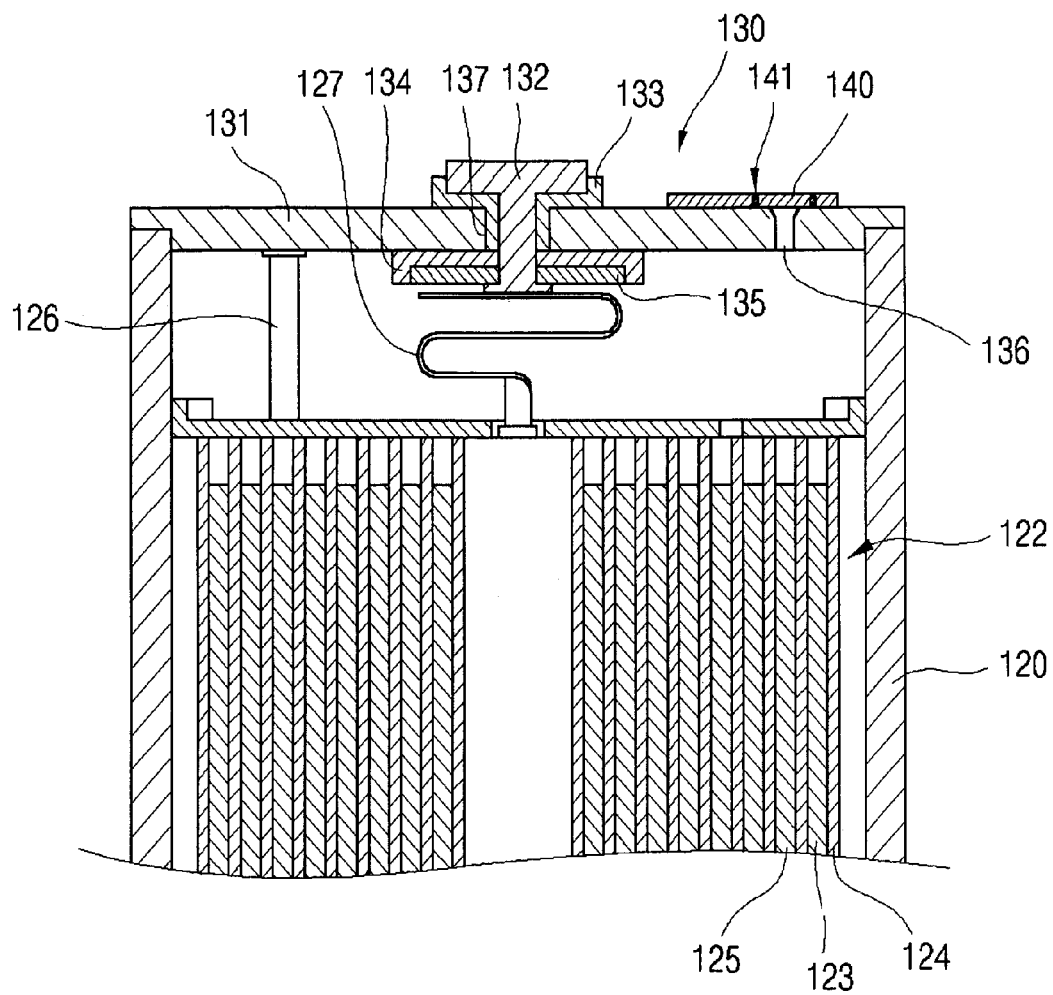
FIG. 2a is a partial sectional view of the upper portion of a secondary battery according to an embodiment of the present invention.
Figure 2B:
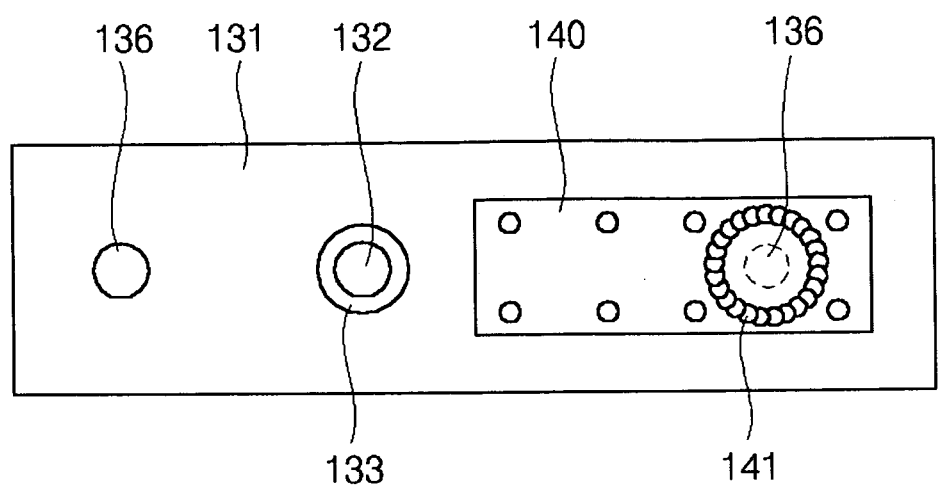
Figure 3:
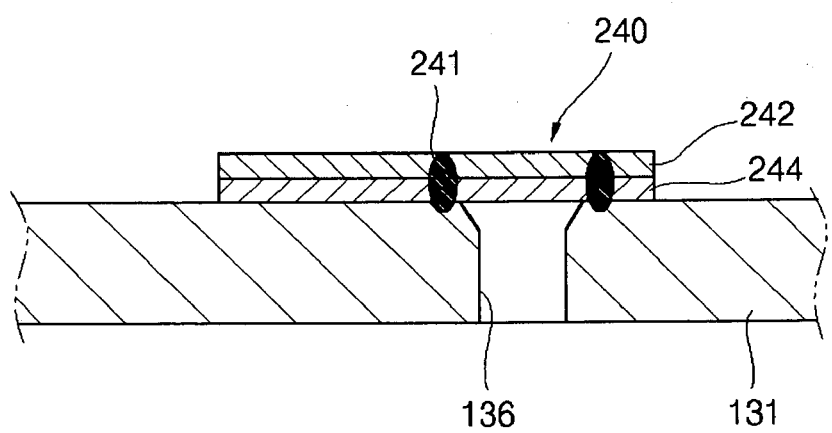
FIG. 3 is an assembled sectional view of a sealing plate according to another embodiment of the present invention.
Figure 4:
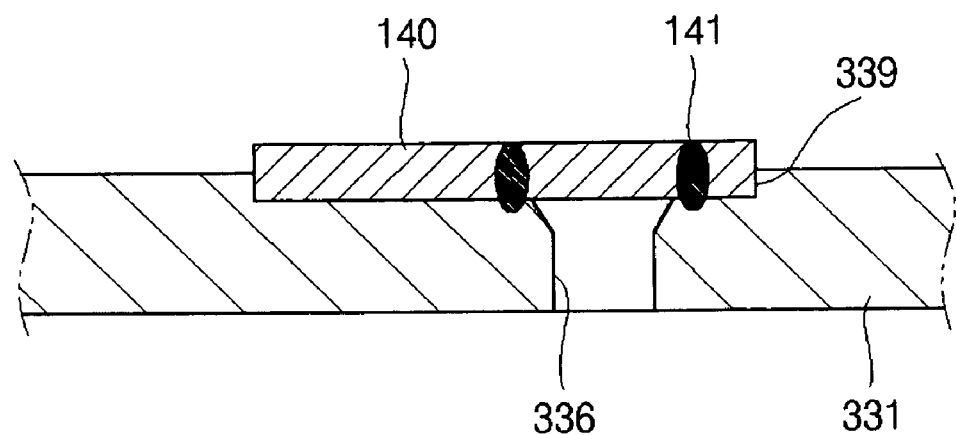
FIG. 4 is an assembled sectional view of a cap plate and a sealing plate according to another embodiment of the present invention.
Figure 5A:
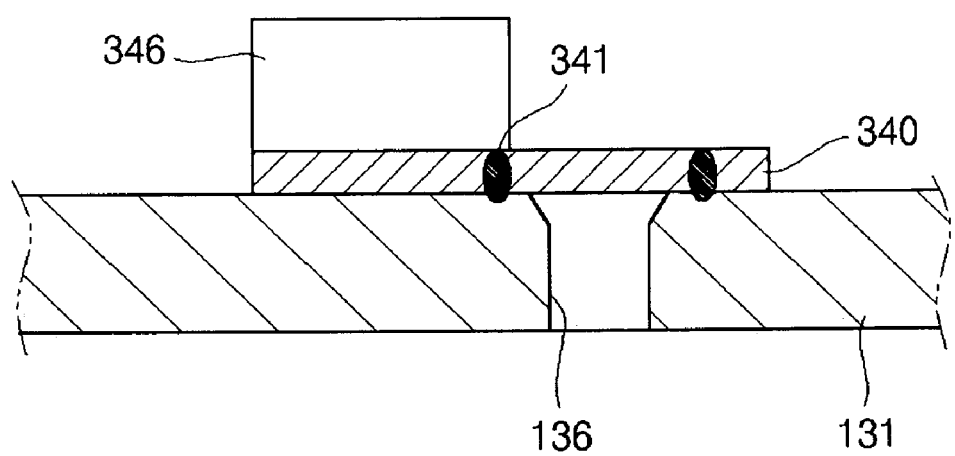
FIG. 5a is an assembled sectional view of a sealing plate according to another embodiment of the present invention.
Figure 5B:
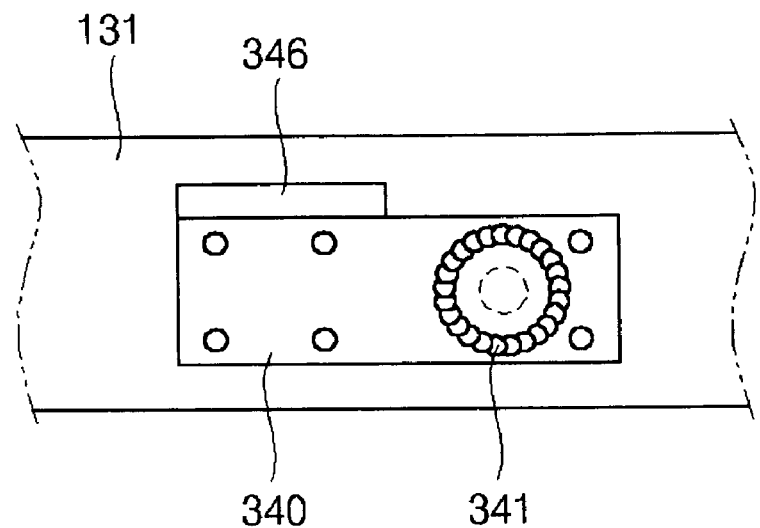
Figure 6:
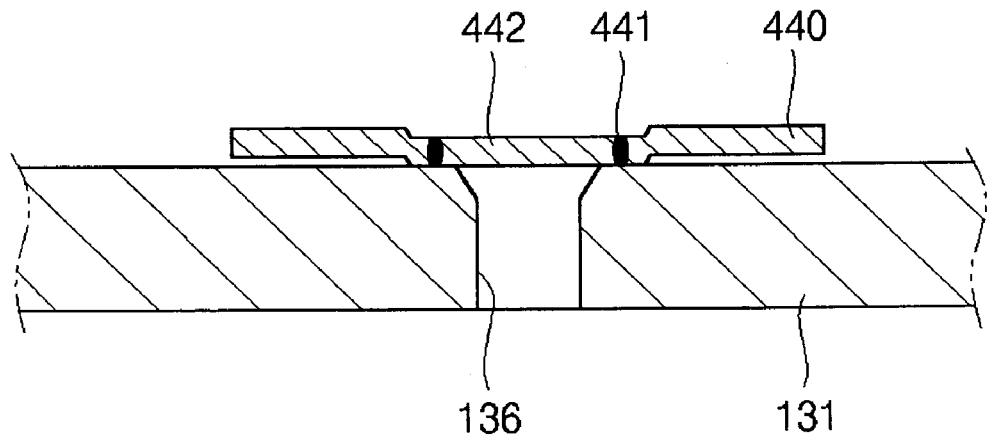
FIG. 6 is an assembled sectional view of a sealing plate according to another embodiment of the present invention.
Figure 7:
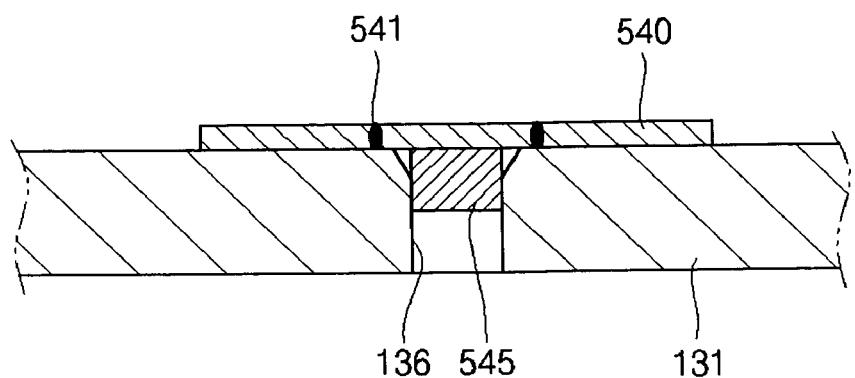
FIG. 7 is an assembled sectional view of a sealing plate according to another embodiment of the present invention.
Figure 8A:
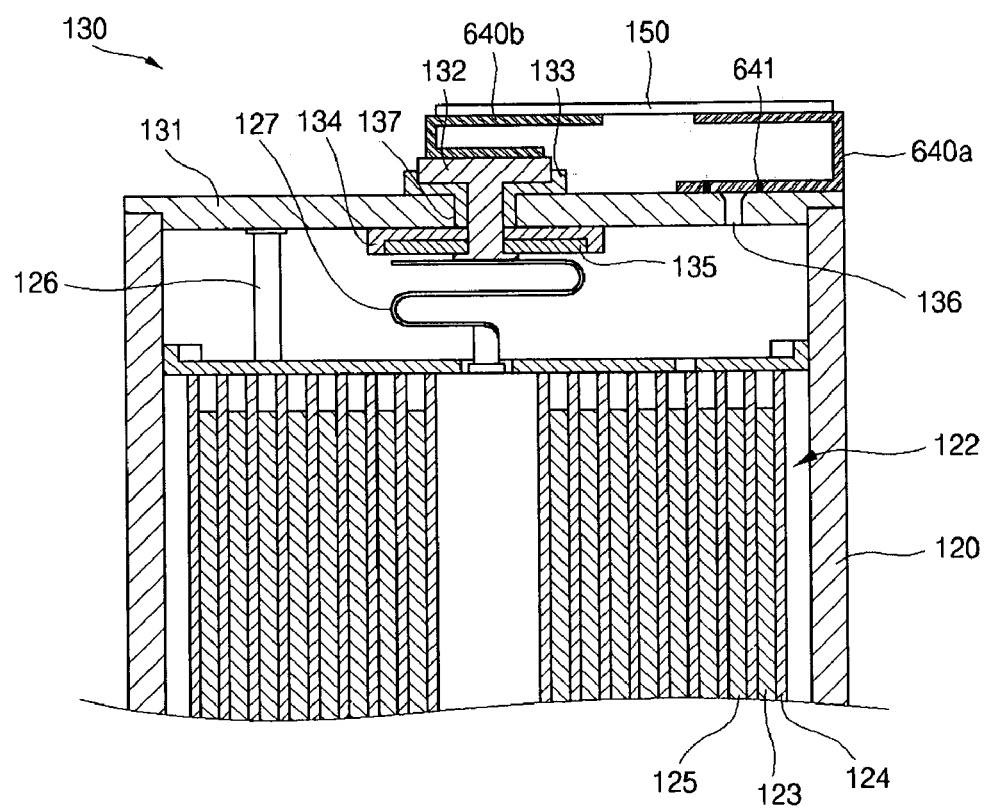
FIG. 8a is a partial sectional view of a lithium secondary battery including a sealing plate according to another embodiment of the present invention.
Figure 8B:
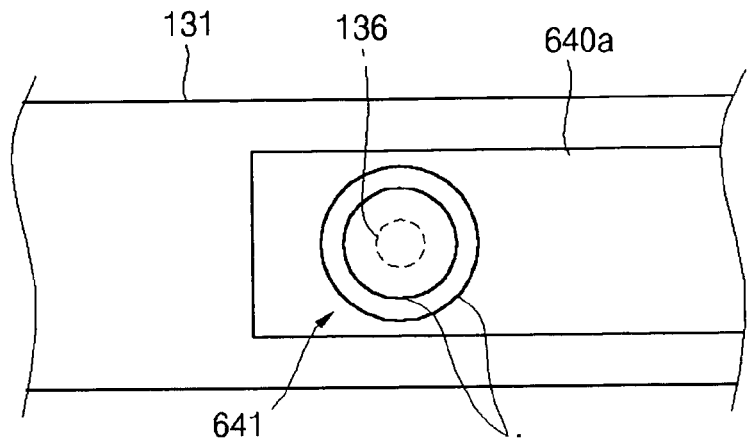
Figure 9:
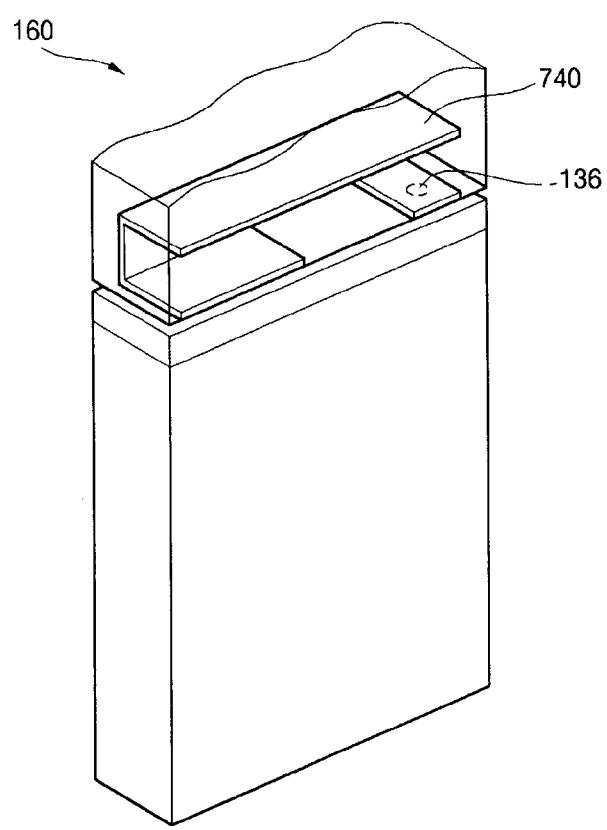
FIG. 9 is a perspective view of a lithium secondary battery including a sealing plate according to another embodiment of the present invention.

FIG. 2a is a partial sectional view of an upper portion of a secondary battery according to an embodiment of the present invention. FIG. 2b is a top view of the secondary battery of FIG. 2a. FIG. 3 is an assembled sectional view of a sealing plate according to another embodiment of the present invention. FIG. 4 is an assembled sectional view of a cap plate and a sealing plate according to another embodiment of the present invention. FIG. 5a is an assembled sectional view of a sealing plate according to another embodiment of the present invention. FIG. 5b is a top view of the sealing plate of FIG. 5a. FIG. 6 is an assembled sectional view of a sealing plate according to another embodiment of the present invention. FIG. 7 is an assembled sectional view of a sealing plate according to another embodiment of the present invention. FIG. 8a is a partial sectional view of a lithium secondary battery including a sealing plate according to another embodiment of the present invention. FIG. 8b is a partial top view of a lead plate of a protective circuit module for sealing the electrolyte injection hole of the secondary battery of FIG. 8a. FIG. 9 is a perspective view of a lithium secondary battery including a sealing plate according to another embodiment of the present invention.

Referring to FIGS. 2a and 2b, the secondary battery according to the present invention includes a can 120, an electrode assembly 122 contained in the can 120, and a cap assembly 130 for sealing the top opening of the can 120.

The can 120 for a square-type lithium secondary battery is a metallic container having a cuboid shape with an open top and is generally made of aluminum or an aluminum alloy which is light and is resistant to corrosion. The can 120 acts as a container for the electrode assembly 122 including a positive electrode 123, a separator 124, and a negative electrode 125 and for an electrolyte. The electrode assembly 122 is inserted into the can 120 via the open top, i.e., the top opening, which is then sealed by the cap assembly 130.

The electrode assembly 122 is formed by laminating the positive and negative electrode plates 123 and 125 with the separator 124 interposed between them and winding them into a jelly-roll. The positive electrode plate 123 has a positive electrode tab 126 welded thereto, an end of which protrudes from the top of the electrode assembly 122. The negative electrode plate 125 has a negative electrode tab 127 welded thereto, an end of which protrudes from the top of the electrode assembly 122. The positive electrode plate 123 is electrically connected to the cap plate 131 via the positive electrode tab 126 and the negative electrode plate 125 is electrically connected to the negative terminal 132 of the cap plate 131 via the negative electrode tab 127. As such, the can 120 is electrically insulated from the negative terminal 132 and acts as a positive terminal.

The cap assembly 130 includes a cap plate 131, an electrode terminal 132, and a sealing plate 140.

The cap plate 131 is a planar plate having a size and shape corresponding to those of the top opening of the can 120 and has a terminal through-hole 137 formed at the center thereof and an electrolyte injection hole 136 formed on a side thereof. The upper portion of the electrolyte injection hole 136 is preferably chamfered to prevent the corner from becoming sharp. The cap plate 131 is preferably made of the same material as the can 120 (i.e., aluminum or an aluminum alloy) for improved weldability to the can 120.

The electrode terminal 132 extends through the terminal through-hole 137 and is coupled thereto. A tubular gasket 133 is positioned on the exterior of the electrode terminal 132 for electrically insulating the electrode terminal 132 from the cap plate 131. The electrode terminal 132 generally acts as a negative terminal. An insulation plate 134 is positioned on the bottom surface of the cap plate 131 near the terminal through-hole of the cap plate 131. A terminal plate 135 is positioned on the bottom surface of the insulation plate 134.

The sealing plate 140 seals the electrolyte injection hole 136 on the top surface of the cap plate. The sealing plate 140 is a plate having a predetermined size and is welded to the periphery of the electrolyte injection hole 136 to seal it. Particularly, the sealing plate 140 is welded to the periphery of the electrolyte injection hole 136 to seal it in such a manner that the welded portion 141 forms a closed loop. The closed loop formed by the welded portion 141 preferably has the shape of a ring about the electrolyte injection hole 136 for easiness of the welding process. The sealing plate 140 is made of nickel or aluminum, and is preferably made of nickel for constant strength. The sealing plate 140 has a thickness of 0.05 to 0.45 mm and the thickness of the sealing plate 140 is related to the sealing performance of the sealing plate 140, the thickness of the cap plate 131, and ease of welding. If the thickness of the sealing plate 140 is too small, the sealing efficiency of the sealing plate 140 degrades and, when the electrode tab of a protective circuit module is fixed, the electrode tab cannot be supported. If the thickness of the sealing plate 140 is too large, welding becomes difficult.

The sealing plate 140 is larger than the electrolyte injection hole 136 so that, during welding, the welded portion 141 is formed while being spaced a predetermined distance from the electrolyte injection hole 136. Preferably, the inner side of the ring formed by the welded portion 141 is spaced at least 0.1 mm from the electrolyte injection hole 136. If the welded portion is formed on the electrolyte injection hole, they can become incomplete and a pin hole can be created due to the electrolyte remaining on the electrolyte injection hole and cause the sealing to become incomplete.

Preferably, the sealing plate 140 is welded by laser welding. When welding the sealing plate 140, the depth of welding is 0.15 to 0.5 mm depending on the material and thickness of the sealing plate 140 and the cap plate 131. If the depth of welding of the sealing plate 140 is too small, the welding can become incomplete and the welded portion can peel off later. If the depth is too large, the sealing plate 140 or the cap plate 131 can be damaged or a gap can be created on the welded portion, through which the electrolyte can leak.

The sealing plate 140 can extend along the longitudinal direction so that a side thereof is welded to the electrolyte injection hole 136 and the other side thereof is connected to the electrode tab of the protective circuit module. In this case, the sealing plate 140 acts as a lead plate.

FIG. 3 is an assembled sectional view of a sealing plate according to another embodiment of the present invention.

Referring to FIG. 3, the sealing plate 240 can be formed by bonding different kinds of metal. Preferably, the sealing plate 240 is formed by bonding an upper nickel metal plate 242 and a lower aluminum metal plate 244. The sealing plate 240 is welded in such a manner that welded portion 241 is formed in a circular shape with a diameter larger than that of the electrolyte injection hole 136. As such, the lower portion of the sealing plate 240 which faces the cap plate 131 is made of the same metal as the cap plate 131 (i.e., aluminum) for improved weldability. The nickel metal plate 242 which constitutes the upper portion of the sealing plate 240 maintains the strength of the sealing plate 240 and improves the weldability to the electrode tab (made of nickel) of the protective circuit module (not shown in the drawing).

FIG. 4 is an assembled sectional view of a cap plate and a sealing plate according to another embodiment of the present invention.

Referring to FIG. 4, the cap plate 331 according to another embodiment of the present invention has a seating groove 339 formed on top of the electrolyte injection hole 336 and having a size corresponding to that of the sealing plate 140, the seating groove 339 recessed from the top surface of the cap plate 331. The seating groove 339 is recessed a depth which is smaller than the thickness of the sealing plate 140 from the top surface of the cap plate 331. The sealing plate 140 is seated on the seating groove 339 and is fixed thereto by welding in such a manner that welded portion 141 is formed in a circular shape with a diameter larger than that of the electrolyte injection hole 336. The welded portion 141 can be formed in a square shape. As such, the sealing plate 140 is welded while being seated in a fixed position and the coupling position to the electrode tab of the protective circuit module (not shown in the drawing) is also fixed. Therefore, a failure caused by an unfixed welding position can be avoided.

FIG. 5*a* is an assembled sectional view of a sealing plate according to another embodiment of the present invention and FIG. 5*b* is a top view of the sealing plate of FIG. 5*a*.

Referring to FIGS. 5*a* and 5*b*, the sealing plate 340 according to another embodiment of the present invention has an extension 346 extending upward from a lateral surface of the other side thereof. The sealing plate 340 is welded in such a manner that welded portion 341 is formed in a circular shape with a diameter larger than that of the electrolyte injection hole 136. The welded portion 341 can also be formed in a square shape. The extension 346 has a predetermined height and width, and preferably has a height smaller than that of the electrode terminal (not shown in the drawing) so that the secondary battery can be manufactured in a more compact size. The connection lead of the protective circuit module positioned on top of the cap plate 131 can be welded and coupled to the extension 346.

FIG. 6 is an assembled sectional view of a sealing plate according to another embodiment of the present invention.

Referring to FIG. 6, the sealing plate 440 according to another embodiment of the present invention has a welding member 442 protruding downward in an area corresponding to the electrolyte injection hole 136 of the cap plate 131. The welding member 442 has a predetermined shape and an area larger than that of the electrolyte injection hole 136. The welding member 442 preferably has a circular shape with a diameter larger than that of the electrolyte injection hole 136 and is welded to the cap plate 131 in such a manner that the welded portion 441 is formed on the outer portion of the welding member 442 in the circumferential direction. The welded portion 441 can also be formed in a square shape having sides larger than the diameter of the electrolyte injection hole 136. As the sealing plate 440 is tightly fastened to the top surface of the cap plate 131 in the region of the welded portion 442, welding can be performed more easily and any welding fault caused by partial poor contact between the sealing plate 440 and the cap plate 131 can be avoided.

FIG. 7 is an assembled sectional view of a sealing plate according to another embodiment of the present invention.

Referring to FIG. 7, the sealing plate 540 according to another embodiment of the present invention has an elastic body 545 attached to the bottom surface thereof with an outer diameter corresponding to the inner diameter of the electrolyte injection hole 136. If the electrolyte injection hole 136 has a cylindrical shape, for example, the elastic body 545 has the shape of a circular post having an outer diameter corresponding to the inner diameter of the electrolyte injection hole 136. The elastic body 545 preferably has a height less than the thickness of the cap plate 131. The elastic body 545 is made of an elastic organic material, and is preferably made of a material having a resistance to the electrolyte, including PolyPropylene (PP), PolyPhenylene Sulfide (PPS), PolyImide (PI), and Nylon 66, but the selected material is not limited thereto. The elastic body 545 is inserted into the electrolyte injection hole 136 when the sealing plate 540 is seated on the cap plate 131 and primarily seals the electrolyte injection hole 136. The sealing plate 540 is welded to the cap plate 131 by forming the welded portion 541 on the periphery of the electrolyte injection hole 136. The welded portion 541 can be formed in a circular or square shape with a diameter or side larger than the diameter of the electrolyte injection hole 136.

FIG. 8*a* is a partial sectional view of a lithium secondary battery including a sealing plate according to another embodiment of the present invention. FIG. 8*b* is a top view of the position and welding line of a lead plate of a protective circuit module for sealing the electrolyte injection hole.

Referring to FIGS. 8*a* and 8*b*, the sealing plate according to another embodiment of the present invention is formed as a one of the positive and negative electrode lead plates 640*a* and 640*b* connected to the bottom surface of the protective circuit module 150 which is positioned on top of the electrolyte injection hole 136 and the electrode terminal 132. The positive and negative electrode lead plates 640*a* and 640*b* electrically connect the protective circuit module 150 to the electrode terminal 132 and the cap plate 131 and can be made of conductive Nickel (Ni), Aluminum (Al), aluminum coated with nickel, or laminated nickel and aluminum thin plates.

The electrolyte injection hole 136 is sealed by welding the sealing plate, i.e., the positive electrode lead plate 640*a*, along the welding line L of the welded portion 641 formed on the periphery of the electrolyte injection hole 136 while the sealing plate is completely covering the electrolyte injection hole 136. The welding is preferably laser welding and the welding area enclosed by the welding line L of the welded portion 641 is preferably at least two times larger than the sectional area of the electrolyte injection hole 136 for improved sealing property. The welding line L of the welded portion 641 forms a closed loop on the outer periphery of the electrolyte injection hole 136 as shown in FIG. 8*b* and can be a dual line including inner and outer lines. The dual welding line L is advantageous to improving the sealing property. Particularly, even when welding failure occurs at the inner welding line, the outer welding line secondarily compensates for it. This further improves the sealing.

When the welding line L of the welded portion 641 is positioned outside of the outer periphery of the electrolyte injection hole 136, the weldability is further improved. No capillary phenomenon occurs near the electrolyte injection hole 136, because no ball is plugged into the electrolyte injection hole 136. Even when the outer periphery of the electrolyte injection hole 136 is contaminated, the welding line L is spaced from the electrolyte injection hole 136 with a distance enough to compensate for the contamination. Therefore, contamination by the electrolyte does not occur near the welding line L, where actual welding is performed, nor does welding failure.

When one of the lead plates 640*a* and 640*b* is used as a sealing plate to seal the electrolyte injection hole 136 in this manner, the number of processes necessary for manufacturing the lithium secondary battery is reduced. Particularly, the process of pressing a separate ball into the electrolyte injection hole 136 to seal it is omitted. The process of connecting the protective circuit module 150 and the process of sealing the electrolyte injection hole 136 are combined into a single process. A UV process preformed after sealing the electrolyte injection hole 136 in the conventional manufacturing process is omitted in the present invention. The conventional process of fixing a welding improvement plate on the bottom surface of the case and fixing the positive electrode lead plate, among the lead plates for connecting the protective circuit module, thereon is omitted. This reduces the overall height of the battery and makes it possible to manufacture a lithium secondary battery of a slim size.

The negative electrode lead plate 640*b* is welded and fixed on top of the negative terminal 132 to connect the protective circuit module 150 of the secondary battery. The connection of the positive and negative electrode lead plates 640*a* and 640*b* can be switched depending on the structure of the secondary battery.

FIG. 9 is a perspective view of a lithium secondary battery including a sealing plate according to another embodiment of the present invention. The internal construction of the lithium secondary battery is the same as that of the above-mentioned lithium secondary battery and detailed description thereof has been omitted.

As shown in FIG. 9, the sealing plate according to another embodiment of the present invention is formed as a guide 740 of a molding portion 160. The molding portion 160 is made of foamed resin and is used to integrate the cap plate and the protective circuit module (not shown in the drawing) while substantially protecting the protective circuit module. The molding portion 160 is formed as follows: when a lithium secondary battery is manufactured, the guide portion 740 is welded and fixed to the cap plate. The guide 740 is a cube made of a metallic material and defines the shape of the molding resin when it is cured. When the guide 160 is welded and fixed to the cap plate, a welding line is additionally formed on the periphery of the electrolyte injection hole 136 as shown in FIG. 8*a* to form the molding portion 160. In this manner, the electrolyte injection hole 136 is sealed with reduced number of manufacturing processes. As such, the electrolyte injection hole is sealed using the plate as a sealing plate in the process of substantially fixing the plate to the cap plate without any additional component. This reduces the number of components and manufacturing processes.

The operation of the secondary battery according to the present invention is as follows.

The electrode assembly 122 is contained in the can 120, an electrolyte is injected through the top opening of the can 120, and the cap assembly 130 is welded and coupled thereto. The electrolyte is injected into the can 120 through the electrolyte injection hole 136 of the cap plate 131. After the electrolyte is injected into the can 120, the sealing plate 140 is positioned on top of the electrolyte injection hole 136 and is welded to the cap plate 131 to seal the electrolyte injection hole 136. The welded portion between the cap plate 131 and the sealing plate 140 is positioned as far from the electrolyte injection hole 136 as possible to prevent the electrolyte from flowing into the welded portion 141. Particularly, no fine gap is formed in the electrolyte injection hole 136, in contrast to the prior art, and the electrolyte is prevented from flowing therein due to a capillary phenomenon. As such, the welded portion does not become incomplete and no welding failure occurs.

The positive electrode tab of the protective circuit module is welded to the other side of the sealing plate 140 to electrically connect the positive electrode of the electrode assembly 122 to the positive electrode tab of the protective circuit module. As such, the sealing plate 140 simultaneously plays the role of a conventional lead plate (labeled 40 in FIG. 1). Therefore, the welding process for plugging the electrolyte injection hole 136 and the welding process of the lead plate of the cap plate 131 for connection to the positive electrode tab of the protective circuit module are combined into a single process.

According to the secondary battery of the present invention, the electrolyte injection hole is sealed by welding the sealing plate on top of the cap plate so that the electrolyte is prevented from flowing into the welded portion. Since no fine gap is created in the electrolyte injection hole, the electrolyte is prevented from flowing into the welded portion due to a capillary phenomenon and no pinhole is caused by the electrolyte and formed in the welded portion.

No aluminum ball needs to be pressed into the electrolyte injection hole and the deformation of the electrolyte injection hole caused by the pressed aluminum ball is avoided. No gap is created in the electrolyte injection hole and the electrolyte is prevented from leaking.

Since the sealing plate simultaneously performs the function of a conventional lead plate, the welding process for plugging the electrolyte injection hole and the welding process of the lead plate of the cap plate for connection to the positive electrode tab of the protective circuit module are combined into a single process. This shortens the manufacturing process.

The electrolyte injection hole is reliably sealed with reduced number of processes. This reduces the production time and cost of the lithium secondary battery and improves the competitiveness of the product.

Although exemplary embodiments of the present invention have been described for illustrative purposes, those skilled in the art will appreciate that various modifications, additions and substitutions are possible, without departing from the scope and spirit of the invention as recited in the following claims.

What is claimed is:

1. A secondary battery, comprising:
    an electrode assembly including positive and negative electrode plates;
    a can adapted to contain the electrode assembly and an electrolyte;
    a cap assembly including a cap plate having an electrolyte injection hole arranged on a side thereof and adapted to seal an opening of the can;
    a protective circuit module electrically coupled to the cap assembly;
    a sealing plate arranged on a surface of the cap plate and adapted to seal the electrolyte injection hole; and
    a welded portion welding said sealing plate to said cap plate and forming a complete circle entirely surrounding said electrolyte injection hole,
        wherein an inner side of said welded portion is spaced at least 0.1 mm from said electrolyte injection hole, wherein the sealing plate extends along a longitudinal direction, and wherein one side of the sealing plate is welded to the electrolyte injection hole, and wherein an electrode tab of the protective circuit module is connected to another side thereof.

2. The secondary battery as recited in claim 1, wherein the sealing plate is welded to the surface of the cap plate.

3. The secondary battery as recited in claim 1, wherein the sealing plate is welded by laser welding.

4. The secondary battery as recited in claim 3, wherein the welding depth is in a range of 0.15 mm to 0.50 mm.

5. The secondary battery as recited in claim 1, wherein the sealing plate comprises a nickel metal plate.

6. The secondary battery as recited in claim 1, wherein the sealing plate comprises a nickel metal plate bonded to an aluminum metal plate.

7. The secondary battery as recited in claim 1, wherein the sealing plate has a thickness in a range of 0.05 to 0.45 mm.

8. The secondary battery as recited in claim 1, wherein the sealing plate has an extension extending from a lateral surface of another side thereof and wherein the electrode tab of the protective circuit module is connected to the extension.

9. The secondary battery as recited in claim 1, wherein the cap plate has a seating groove arranged on the electrolyte injection hole, the groove having a size corresponding to that of the sealing plate to seat the sealing plate thereon.

10. The secondary battery as recited in claim 1, wherein the sealing plate has a welding member protruding downward in an area corresponding to the electrolyte injection hole and wherein the welding member is welded to the cap plate at an outer portion of the welding member.

11. The secondary battery as recited in claim 10, wherein the welding member has a circular or square shape having a diameter or side larger than a diameter of the electrolyte injection hole.

12. The secondary battery as recited in claim 1, wherein the sealing plate has an elastic body arranged on the bottom surface thereof, the elastic body having an outer diameter corresponding to an inner diameter of the electrolyte injection hole.

13. The secondary battery as recited in claim 12, wherein the elastic body has a height less than a thickness of the cap plate.

14. The secondary battery as recited in claim 12, wherein the elastic body comprises an organic material chosen from a group consisting of PolyPropylene (PP), PolyPhenylene Sulfide (PPS), Polylmide (PI), and Nylon.

15. A secondary battery, comprising:
    an electrode assembly including positive and negative electrode plates;
    a can adapted to contain the electrode assembly and an electrolyte;
    a cap assembly including a cap plate having an electrolyte injection hole arranged on a side thereof and adapted to seal an opening of the can;
    a protective circuit module electrically coupled to the cap assembly;
    a sealing plate arranged on a surface of the cap plate and adapted to seal the electrolyte injection hole; and
    a welded portion welding said sealing plate to said cap plate and forming a complete circle entirely surrounding said electrolyte injection hole,
    wherein an inner side of said welded portion is spaced at least 0.1 mm from said electrolyte injection hole,
    wherein the protective circuit module has positive and negative electrode lead plates connected to the positive and negative electrodes of the secondary battery and wherein the sealing plate comprises one of the lead plates and is fixed on the electrolyte injection hole while forming a welded portion larger than an outer periphery of the electrolyte injection hole.

16. The secondary battery as recited in claim 15, wherein the lead plate comprises a conductive plate.

17. The secondary battery as recited in claim 15, wherein the negative electrode lead plate is welded and fixed to the negative terminal of the secondary battery and the positive electrode lead plate is welded and fixed to the cap plate on the electrolyte injection hole.

18. The secondary battery as recited in claim 15, wherein the protective circuit module is arranged on the cap assembly.

19. The secondary battery as recited in claim 15, wherein the welded portion surrounds an outer periphery of the electrolyte injection hole.

20. The secondary battery as recited in claim 15, wherein an area of the welded portion is at least twice a sectional area of the electrolyte injection hole.

21. The secondary battery as recited in claim 15, wherein the welded portion has at least two welding lines and wherein one of the welding lines surrounds the other welding line.

22. The secondary battery as recited in claim 1, wherein an upper portion of the electrolyte injection hole is chamfered.

23. The secondary battery as recited in claim 1, wherein the electrode assembly comprises the positive and negative electrode plates being wound together with a separator arranged therebetween.

* * * * *